UNITED STATES PATENT OFFICE.

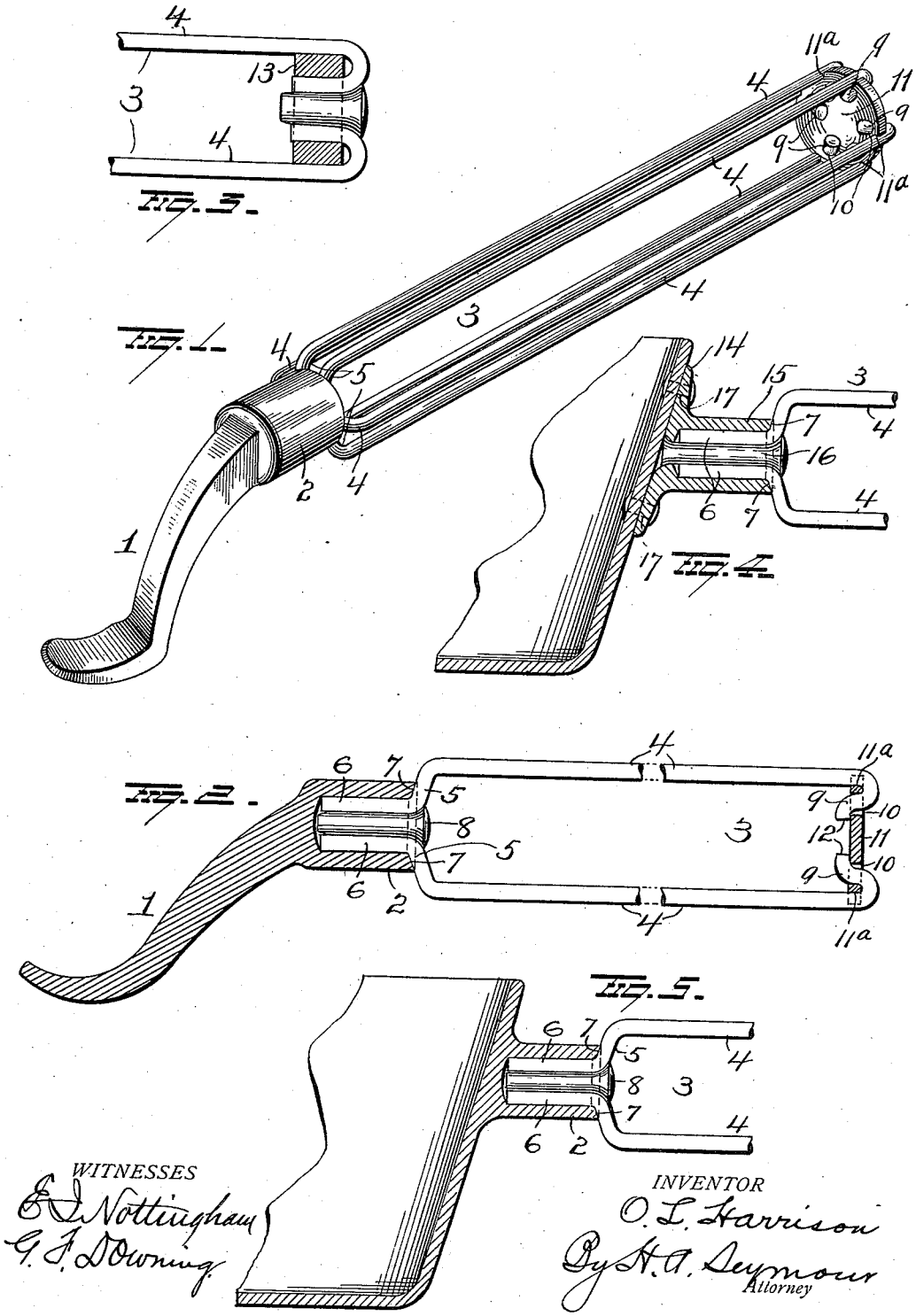

OWEN L. HARRISON, OF COLETA, ILLINOIS.

HANDLE FOR ARTICLES OF HARDWARE.

1,015,022.  Specification of Letters Patent.  Patented Jan. 16, 1912.

Application filed September 3, 1910. Serial No. 580,374.

*To all whom it may concern:*

Be it known that I, OWEN L. HARRISON, of Coleta, in the county of Whiteside and State of Illinois, have invented certain new and useful Improvements in Handles for Articles of Hardware; and I do hereby declare the following to be a full, clear, and exact description of the invention, such as will enable others skilled in the art to which it appertains to make and use the same.

This invention relates to improvements in handles for articles of hardware, such as stove-lid lifters, pokers, culinary utensils, etc.,—the object of the invention being to provide a simple and substantial construction which can be easily and quickly assembled to form a ventilated handle.

With this object in view the invention consists in certain novel features of construction and combinations of parts as hereinafter set forth and pointed out in the claims.

In the accompanying drawings, Figure 1 is a perspective view illustrating the application of my improvements to a stove-lid lifter. Fig. 2 is a sectional view of the same. Fig. 3 is a sectional view showing a modification, and Figs. 4 and 5 are views illustrating the adaptability of my improvements to a culinary utensil.

1 represents the hook-portion of a stove-lid lifter which is provided at its rear end with a socketed member 2. The handle 3 comprises an annular series of wires 4 which are suitably spaced apart and bent inwardly at one end, forming shoulders 5, from which latter the wires are extended to form fingers 6 disposed within the socketed member 2 and the upper end of the latter is beveled inwardly as at 7 to permit the shouldered ends of the wire handle members to lie closely against the said socketed member 2. When the fingers at the ends of the wire handle members shall have been inserted into the socketed member 2, a pin or key 8 will be driven into the socketed member so as to force the fingers 6 against the wall of the member 2 with sufficient pressure to lock the fingered ends of the wire handle members to the socketed member. The pin or key 8 is preferably made cylindrical in form and provided at one end with a point and at the other end with a head.

Before the wire handle members shall have been connected with the socketed portion 2 of the lifter 1, as above described, the upper or rear end of the wires 4 will be provided with hooks 9 which are inserted through an annular series of holes 10 in a disk 11, said hooks being so formed that after they shall have been inserted through the holes in the disk, the free ends 12 of said hooks will project inwardly and engage the inner face of the disk 11 as clearly shown in Fig. 2. In order that the wires shall be properly spaced the disk 11 is provided with notches 11ᵃ for their reception. After wire handle members shall have been attached to the disk 11, as above explained, the fingered ends of said wire handle members will be secured in the socketed portion of the lifter, as already described and a handle will be formed having no central core to radiate heat to the longitudinally disposed wires and the latter will be so spaced apart as to permit free circulation of air through the handle to prevent undue heating of the same.

Instead of connecting the upper or rear ends of the wire handle members by means of a perforated disk, a ring 13 may be employed and the upper hooked ends of said wire handle members inserted through the opening of said ring (the latter constituting in effect a socketed member) and a key driven through the ring in such manner as to force the hooked ends of the handle members firmly against the inner face of said ring and thus securely fasten the parts together.

When the handle is to be applied to a cooking utensil, a plate 14 may be employed and provided with a socketed member 15 for the reception of the fingered ends of the wire handle members and if desired a key, such as shown at 16 Fig. 4, may be employed and upset at both ends. The plate 14 is provided with holes 17 for the accommodation of fastening devices to secure the same to the utensil. Instead of employing the plate 14 the socketed member may be made integral with the utensil and in that event a key such as shown in Fig. 2 would be employed and driven in place.

Various other slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is,—

1. A handle comprising a socket member, a plurality of wire handle members having portions at one end closely assembled and inserted in said socket member, a key driven between the portions of the wire handle members which enter said socket member and forcing them outwardly against the walls of the socket member, and means connecting the other ends of said wire members.

2. A handle comprising an annular series of wire members provided at one end with hooks having shoulders at their free ends, a circular member to which said hooks are secured, a socket member into which the opposite ends of the wire members project, and a key forcing said wire members outwardly against the wall of said socket member.

3. A handle comprising an annular series of wire members, each having a hook at one end and each having a shoulder and a finger at the other end, a perforated disk receiving the hooked ends of said wire members, a socket member into which the fingers of said wire members project, and a key forcing said fingers outwardly against the wall of the socket member.

4. A handle comprising a plurality of wires each having a hook at one end provided with a shoulder, a disk having perforations receiving the hooked and shouldered ends of the wires for connecting said wires properly spaced apart, and means for securing the other ends of said wires in fixed positions.

In testimony whereof, I have signed this specification in the presence of two subscribing witnesses.

OWEN L. HARRISON.

Witnesses:
B. H. KLINE,
ANNA KLINE.

---

Copies of this patent may be obtained for five cents each, by addressing the "Commissioner of Patents, Washington, D. C."